United States Patent [19]
Busby

[11] Patent Number: 6,029,990
[45] Date of Patent: *Feb. 29, 2000

[54] DIRECT DRIVE BICYCLE

[75] Inventor: James S. Busby, Costa Mesa, Calif.

[73] Assignee: GT Bicycles, Inc., Santa Ana, Calif.

[ * ] Notice: This patent is subject to a terminal disclaimer.

[21] Appl. No.: 08/918,402

[22] Filed: Aug. 26, 1997

Related U.S. Application Data

[63] Continuation-in-part of application No. 08/856,469, May 13, 1997.

[51] Int. Cl.$^7$ ........................................................ B62M 1/02
[52] U.S. Cl. ............................................................ 280/261
[58] Field of Search ................................... 280/259–261, 280/238; 74/63, 68, 594.1, 594.2

[56] References Cited

U.S. PATENT DOCUMENTS 439,095  10/1890  Becker .
578,615  3/1897  Travis .

(List continued on next page.)

FOREIGN PATENT DOCUMENTS 155582  3/1954  Australia .
356881  10/1905  France .

(List continued on next page.)

OTHER PUBLICATIONS

1992 Cannondale Spec—Suspension Mountain Biccyles—Articles—10 pgs.
Guide To Suspension & High Performance; (Get With It) "Suspension Speak"; vol. 3, 1992; pp. 9, 13, 14, 30, 31, 36–45, 47, 53, 60, 69, 85, 86, 92, 96, 98, 100, 108–112, 117 & 119.
"Schwinn Buell", Guide To Suspension, vol. 3, 1992, 4 pages.
Suspension Mania Strikes Cycling—Mountain Bike Action/Feb. '92, 3 Pgs.
Boulder Intrepid Al —2 pgs. —Mountain Bike Action/ Mar. '92.
Fischer RS–1—Article—4 pgs.—Mountain Bike Action/Mar. '92.
"Litespeed Suspension", Mountain Bike Action—May '92, 1 page.
Schwinn S.A.S.S.—7 pgs.—Mountain Bike Action—May '92.
Bicycling, May, 1992, pp. 26, 27, 58, 63, 64, and 105.
Welcome to the Next Generation . . . —9 pgs.—Mountain Bike Action—Jun. '92.
Team Shockblok—6 pgs.—Mountain Bike Action—Jul. 1992.
Beating Around the Bush; Mountain Bike Action —Oct. 1992—21 pgs.
Mountain Biking, Nov. 1992, vol. 6, No. 11—22 pages.
Mountain Bike Action, Dec. 1992—14 pages.
Mountain Bike Action, "San Andreas Report Card—Peccadillos, Peculiarities & Traits", Dec. 1992, pp. 80–81.
Mountain Bike Action, "AMP Mongoose", Jul. 1992, p. 5 pgs.
Mountain Bike Action, "Buyer's Guide", May 1993, pp. 108 & 110.
Mountain Biking; "Pass Press 93"; Jan. 1993; vol. 7; No. 1; 10 pages.

(List continued on next page.)

*Primary Examiner*—Christopher P. Schwartz
*Assistant Examiner*—C. T. Bartz
*Attorney, Agent, or Firm*—Stetina Brunda Garred & Brucker

[57] ABSTRACT

A direct drive bicycle comprising a main frame. Rotatably mounted within the main frame is a variable rate transmission unit having rotatable input and output shafts. Rotatably connected to the main frame is a chain wheel. The chain wheel is mechanically coupled to the input shaft of the transmission unit in a manner wherein the rotation of the chain wheel facilitates the rotation of the input shaft.

23 Claims, 3 Drawing Sheets

6,029,990

Page 2

U.S. PATENT DOCUMENTS

| | | |
|---|---|---|
| 603,418 | 5/1898 | Andriance . |
| 606,323 | 6/1898 | Wronski . |
| 618,627 | 1/1899 | Travis . |
| 657,667 | 9/1900 | Mills . |
| 944,795 | 12/1909 | Leet et al. . |
| 1,047,430 | 12/1912 | Michaelson . |
| 1,130,828 | 3/1915 | Kuehn . |
| 1,257,761 | 2/1918 | Strand . |
| 1,298,958 | 4/1919 | Johnston . |
| 1,412,012 | 4/1922 | Bruno . |
| 1,594,079 | 1/1926 | Tanner . |
| 2,132,317 | 10/1938 | Pease ............ 280/284 |
| 2,283,671 | 5/1942 | Finlay et al. ............ 280/284 |
| 2,446,731 | 8/1948 | Wheler ............ 280/284 |
| 2,550,876 | 5/1951 | Spencer ............ 280/276 |
| 2,587,882 | 3/1952 | Corning ............ 155/164 |
| 3,290,949 | 12/1966 | Samet ............ 74/5 |
| 3,522,957 | 8/1970 | Topor ............ 280/283 |
| 3,834,721 | 9/1974 | Gobby ............ 280/7.15 |
| 3,917,313 | 11/1975 | Smith et al. ............ 280/284 |
| 3,942,821 | 3/1976 | Bock ............ 280/277 |
| 3,948,543 | 4/1976 | MacDonald et al. ............ 280/284 |
| 3,982,776 | 9/1976 | Satoh et al. ............ 280/284 |
| 3,984,119 | 10/1976 | Okazima ............ 280/276 |
| 4,039,200 | 8/1977 | McGonegle ............ 280/284 |
| 4,046,396 | 9/1977 | Taylor et al. ............ 280/281 |
| 4,057,264 | 11/1977 | Suzuki et al. ............ 280/276 |
| 4,058,181 | 11/1977 | Buell ............ 180/32 |
| 4,153,266 | 5/1979 | Uhis ............ 280/276 |
| 4,186,936 | 2/1980 | Offenstadt et al. ............ 280/277 |
| 4,322,088 | 3/1982 | Miyakoshi et al. ............ 280/284 |
| 4,367,882 | 1/1983 | Alexander et al. ............ 280/276 |
| 4,392,664 | 7/1983 | Tsuchiya et al. ............ 280/276 |
| 4,421,337 | 12/1983 | Pratt ............ 280/277 |
| 4,433,850 | 2/1984 | Miyakoshi et al. ............ 280/277 |
| 4,506,755 | 3/1985 | Tsuchida et al. ............ 180/227 |
| 4,507,011 | 3/1985 | Brown ............ 403/404 |
| 4,524,844 | 6/1985 | Williams, Jr. ............ 180/219 |
| 4,529,056 | 7/1985 | Kreuz ............ 180/227 |
| 4,568,101 | 2/1986 | Bleustein et al. ............ 208/707 |
| 4,609,202 | 9/1986 | Miyakoshi et al. ............ 280/276 |
| 4,673,053 | 6/1987 | Tanaka et al. ............ 180/227 |
| 4,679,811 | 7/1987 | Shuler ............ 280/284 |
| 4,721,322 | 1/1988 | Hawkins ............ 280/276 |
| 4,732,404 | 3/1988 | Coetzee ............ 280/283 |
| 4,735,276 | 4/1988 | Burton ............ 180/219 |
| 4,789,174 | 12/1988 | Lawwill ............ 280/284 |
| 4,792,150 | 12/1988 | Groendal et al. ............ 280/275 |
| 4,815,763 | 3/1989 | Hartmann ............ 280/276 |
| 4,951,791 | 8/1990 | Creixell ............ 180/219 |
| 4,997,197 | 3/1991 | Shultz ............ 280/275 |
| 5,000,470 | 3/1991 | Kamler et al. ............ 280/275 |
| 5,014,808 | 5/1991 | Savard et al. ............ 180/219 |
| 5,080,384 | 1/1992 | Groendal et al. ............ 280/275 |
| 5,098,114 | 3/1992 | Jones ............ 280/284 |
| 5,102,155 | 4/1992 | Chow ............ 280/236 |
| 5,121,937 | 6/1992 | Lawwill ............ 280/284 |
| 5,205,572 | 4/1993 | Buell et al. ............ 280/284 |
| 5,226,674 | 7/1993 | Buell et al. ............ 280/284 |
| 5,240,269 | 8/1993 | Kerr ............ 280/285 |
| 5,244,224 | 9/1993 | Busby ............ 280/284 |
| 5,259,637 | 11/1993 | Busby ............ 280/284 |
| 5,269,552 | 12/1993 | Yelverton ............ 280/283 |
| 5,284,354 | 2/1994 | McWethy ............ 280/284 |
| 5,295,702 | 3/1994 | Buell ............ 280/284 |
| 5,306,036 | 4/1994 | Busby ............ 280/284 |
| 5,332,246 | 7/1994 | Buell ............ 280/284 |
| 5,335,929 | 8/1994 | Takagaki et al. ............ 280/283 |
| 5,354,085 | 10/1994 | Gally ............ 280/285 |
| 5,370,411 | 12/1994 | Takamiya et al. ............ 280/284 |
| 5,409,249 | 4/1995 | Busby ............ 280/284 |
| 5,441,292 | 8/1995 | Busby ............ 280/284 |
| 5,445,471 | 8/1995 | Wexler et al. ............ 403/220 |
| 5,498,013 | 3/1996 | Hwang ............ 280/283 |
| 5,553,881 | 9/1996 | Klassen et al. ............ 280/284 |
| 5,577,749 | 11/1996 | Ross ............ 280/261 |

FOREIGN PATENT DOCUMENTS

| | | |
|---|---|---|
| 923235 | of 1947 | France . |
| 2395879 | 3/1979 | France . |
| 3033294 | 4/1981 | Germany ............ 280/285 |
| 421518 | of 1947 | Italy . |
| 423515 | of 1947 | Italy . |
| 428442 | 12/1947 | Italy ............ 280/285 |
| 540821 | 3/1956 | Italy ............ 280/284 |
| 5105168 | 4/1995 | Japan . |
| 434883 | 4/1965 | Switzerland . |
| 24918 | of 0000 | United Kingdom ............ 280/284 |
| 17336 | 7/1913 | United Kingdom ............ 208/44 |
| 15332 | 11/1915 | United Kingdom ............ 208/93 |
| 220760 | 8/1924 | United Kingdom . |
| 2084456 | 9/1980 | United Kingdom . |
| 9200397 | 9/1992 | WIPO . |
| 9300502 | 7/1993 | WIPO . |

OTHER PUBLICATIONS

Mountain Biking, "Yeti–Lawwill DH: The Bike That Mert Built"—vol. 10, No. 9, Sep. 1996, pp. 64–70.

Mountain Bike, "Yeti Downhill Bike", Sep. 1996, vol. 12, No. 8, pp. 71–75.

Mountain & City Biking, "Slingshot", 6 pgs.

Offroad Pro–flex 550—3 pgs.—Offroad.

Trek 9000 Series Spec="This Beauty Is A Beast" —Article—8 pages.

"Speed Zone", Mountain Bike, Oct. 1997, p. 32.

"GT Gearbox", Mountain Bike, Dec. 1997, p. 80.

Photo, "Alex Morgan""BCD".

DIRECT DRIVE BICYCLE

RELATED APPLICATION

The present application is a continuation-in-part of U.S. application Ser. No. 08/856,469 entitled DIRECT DRIVE BICYCLE filed May 13, 1997, the disclosure of which is incorporated herein by reference.

FIELD OF THE INVENTION

The present invention relates generally to bicycles, and more particularly to a direct drive bicycle including a variable rate transmission which eliminates the need to include multiple chain wheels, a rear wheel sprocket cluster, and front and rear derailleurs to achieve multiple speed capability.

BACKGROUND OF THE INVENTION

Well known in the prior art are multiple speed bicycles (e.g., a "ten-speed") which generally comprise a bicycle frame consisting of a top tube, down tube, seat tube, a pair of seat stays, and a pair of chain stays. The top, down and seat tubes generally define a front triangle of the bicycle frame, with the seat tube, seat stays and chain stays collectively defining a rear triangle of the bicycle frame. The back ends of corresponding pairs of the seat and chain stays are attached to respective ones of an opposed pair of drop-outs adapted to accommodate the rear wheel axle of the rear wheel. In prior art multiple speed bicycles, the bottom ends of the down and seat tubes and the front ends of the chain stays are typically attached to a sleeve which rotatably accommodates a bottom bracket axle. Attached to the bottom bracket axle is a pair of pedal cranks, each of which includes a pedal roatatably connected thereto.

In addition to the pedal cranks, attached to the bottom bracket axle are multiple chain wheels of differing diameters. Similarly, attached to the rear wheel axle is a sprocket cluster consisting of multiple sprockets of differing diameters. One of the chain wheels is mechanically coupled to one of the sprockets of the sprocket cluster via a drive chain. In the prior art multiple speed bicycles, the drive chain may be selectively shifted onto any one of the chain wheels via a front derailleur which is typically attached to the seat tube. Additionally, the drive chain may be selectively shifted to any one of the sprockets of the sprocket cluster via a rear derailleur which is typically attached to one of the dropouts.

Though prior art multiple speed bicycles have been in existence for many years, they posses certain deficiencies which detract from their overall utility. More particularly, the front and rear derailleurs of the bicycle are of complex construction and typically include multiple parts or components. As such, the derailleurs are extremely susceptible to mechanical failure or breakage, particularly when the bicycle is used in off-road conditions as generally occurs with multiple speed mountain bikes. Additionally, because of their relatively complex construction, the front and rear derailleurs are also susceptible to being displaced from their normal orientations and falling out of proper adjustment when exposed to debris such as dirt or rocks, or when subjected to a sudden impact force as typically occurs when the rider falls. Any such displacement of the front or rear derailleurs usually causes the drive chain to be completely disengaged from the chain wheels or the sprockets of the sprocket cluster when shifting between the chain wheels or the sprockets is attempted by the rider. The re-adjustment of the front and rear derailleurs or the repair thereof in the event of breakage is usually both expensive and time consuming. Additionally, because of the relatively large number of sprockets typically included in the sprocket cluster on the rear wheel axle, the rear wheel cannot be provided with a wide "stance", which would assist in the handling of the bicycle.

The present invention addresses the deficiencies of prior art multiple speed bicycles by providing a direct drive bicycle which includes a variable rate transmission unit. The inclusion of the transmission unit within the bicycle of the present invention provides multiple speed capability, while eliminating the multiple chain wheels, sprocket cluster, and front and rear derailleurs of conventional multiple speed bicycles. In this respect, the direct drive bicycle of the present invention includes only a single chain wheel and a single sprocket attached to the rear wheel thereof. The transmission unit is itself mounted within the main frame or front triangle of the bicycle which protects the same from exposure to and thus potential damage from debris such as dirt and rocks, and further shields and protects the transmission unit in the event the rider falls. The direct drive bicycle of the present invention is further provided with a shock absorbing rear suspension system which enhances its performance in off-road conditions.

SUMMARY OF THE INVENTION

In accordance with a preferred embodiment of the present invention, there is provided a direct drive bicycle which comprises a main frame or front triangle. The main frame itself comprises seat and down tubes having a cartridge housing attached to the bottom ends thereof. Rotatably mounted within the cartridge housing of the main frame via at least one bearing member is a variable rate transmission unit which includes rotatable input and output hubs.

The direct drive bicycle further comprises a crank axle which is rotatably connected to the cartridge housing of the main frame and includes a chain wheel attached thereto. Attached to respective ones of the opposed ends of the crank axle is a pair of pedal cranks, each of which includes a pedal rotatably connected thereto. The rotation of the crank axle via the pedals and pedal cranks facilitates the concurrent rotation of the chain wheel. Attached to the input hub of the transmission unit is an input sprocket which is mechanically coupled to the chain wheel via an input chain extending therebetween. Cooperatively engaged to the input chain is an idler pulley which is rotatably connected to the cartridge housing of the main frame. The idler pulley is used to maintain a desired level of tension on the input chain. The mechanical coupling of the chain wheel to the input sprocket via the input chain causes the rotation of the crank axle to facilitate the rotation of the input hub.

The direct drive bicycle of the present invention further includes a shock absorbing rear assembly comprising a pair of swingarms, the upper ends of which are pivotally connected to the cartridge housing of the main frame at a swingarm pivot which is disposed in close proximity to the transmission unit. Disposed on the lower ends of respective ones of the swingarms is a pair of drop-outs. Rotatably connected to the drop-outs is the axle of a rear wheel. The rear assembly further includes a rocker arm or bell crank, one end of which is pivotally connected to the cartridge housing of the main frame. Pivotally connected to the end of the bell crank opposite that connected to the cartridge housing are the front ends of a pair of chain stays, the back ends of which are pivotally connected to respective ones of the drop-outs. In addition to the swingarms, drop-outs, rear wheel, bell crank and chain stays, the rear assembly includes a shock absorber, the body of which is pivotally connected to the seat tube of the main frame via a shock plate. The distal end of the piston rod of the shock absorber is itself pivotally connected to a portion of the bell crank generally intermediate the opposed ends thereof.

Attached to the output hub of the transmission unit is an output sprocket, while attached to the axle of the rear wheel of the rear assembly is a rear wheel sprocket. Extending between the output sprocket and the rear wheel sprocket is an output chain which mechanically couples the output hub to the rear wheel such that the rotation of the output hub facilitates the rotation of the rear wheel. In the preferred embodiment, the output chain extends along one of the swingarms above and below the swingarm pivot, with the spacing of the output chain above the swingarm pivot being substantially equal to the spacing of the output chain below the swingarm pivot. Rotatably connected to the rear assembly is a pair of output chain sprockets which are cooperatively engaged to the output chain and assist in achieving the desired spacing thereof above and below the swingarm pivot.

BRIEF DESCRIPTION OF THE DRAWINGS

These, as well as other features of the present invention, will become more apparent upon reference to the drawings wherein.

DETAILED DESCRIPTION OF THE PREFERRED EMBODIMENT

Figure 2:
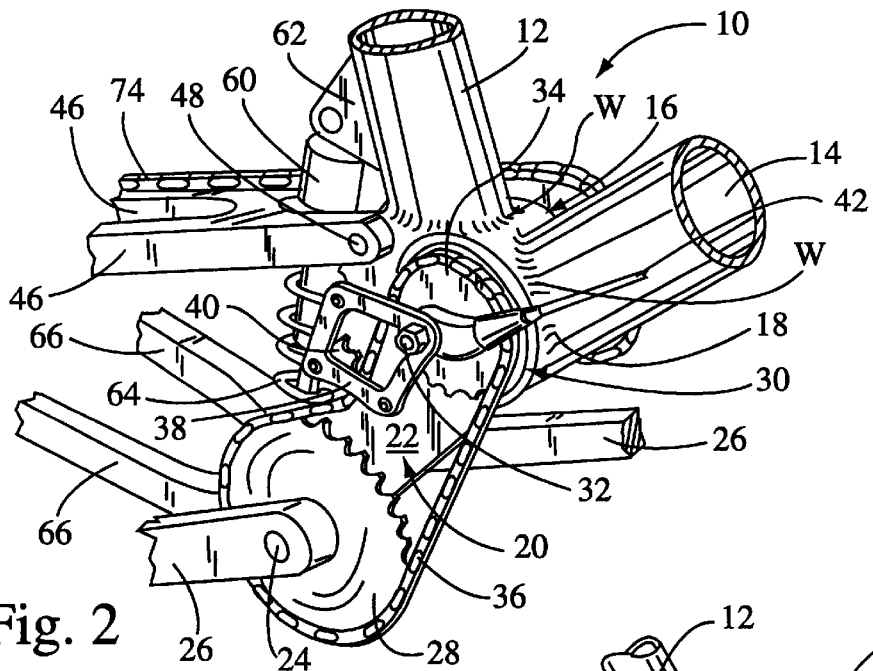
FIG. 2 is a front perspective view of the drive train of the direct drive bicycle constructed in accordance with the present invention.

Referring now to the drawings wherein the showings are for purposes of illustrating a preferred embodiment of the present invention only, and not for purposes of limiting the same, FIGS. 1–4 depict the drive train 10 of a direct drive bicycle constructed in accordance with the present invention. The direct drive bicycle comprises a bicycle frame which includes a front triangle or main frame having a head tube, an elongate top tube, an elongate seat tube 12, and an elongate down tube 14. The front end of the top tube and the top end of the down tube 14 are attached to the head tube which accommodates the stem of the handle bars. Telescopically received into the top end of the seat tube 12 is a seat post having a saddle or seat attached to the top end thereof.

Figure 1:
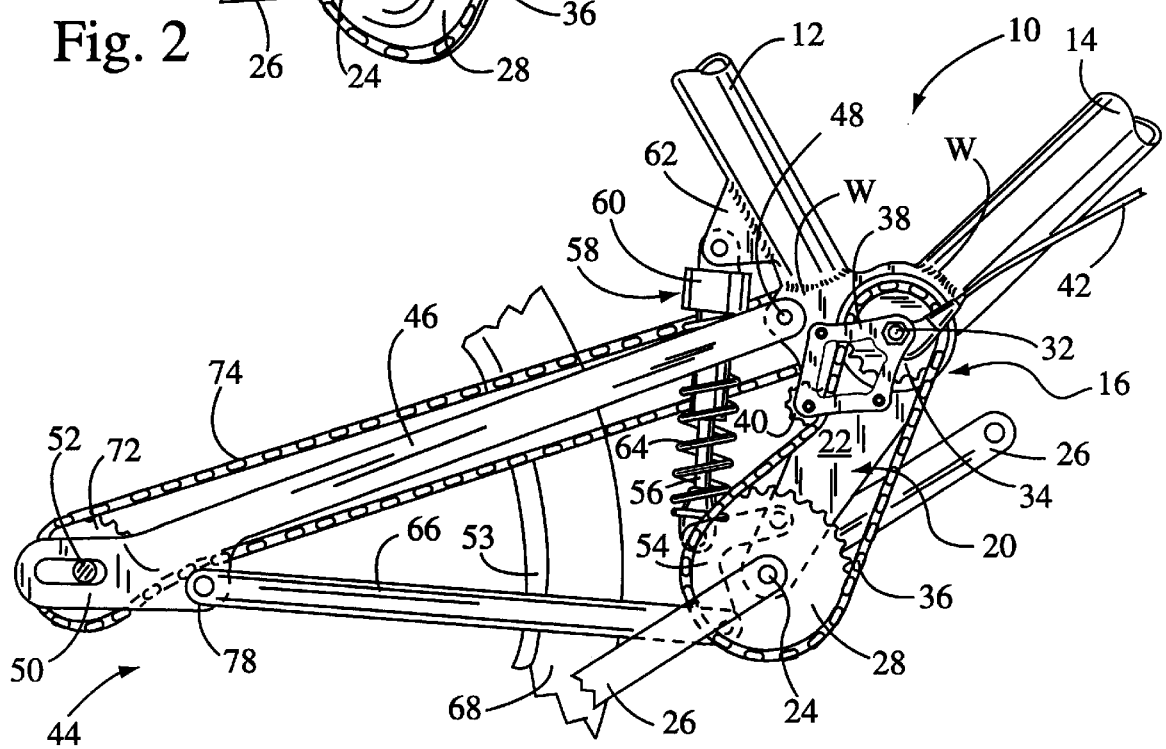
FIG. 1 is a right side elevational view of the drive train of the direct drive bicycle constructed in accordance with the present invention.
Figure 4:
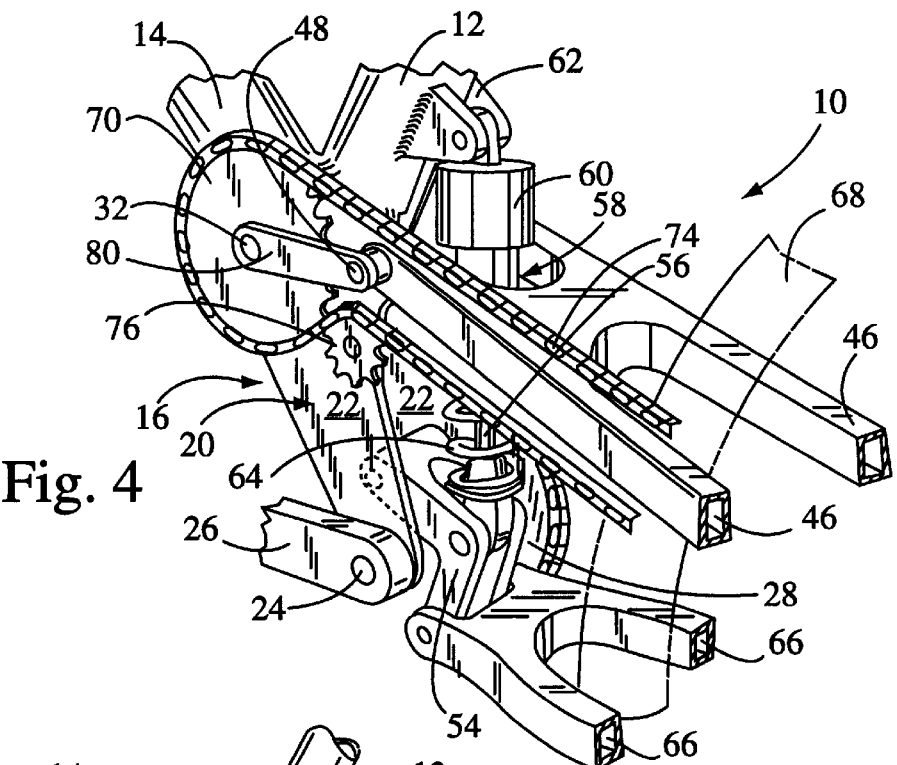
FIG. 4 is a rear perspective view of the drive train of the direct drive bicycle constructed in accordance with the present invention.

As best seen in FIGS. 1 and 2, attached to the front triangle or main frame, and more particularly to the bottom ends of the seat and down tubes 12, 14, is a cartridge housing 16. The cartridge housing 16 is rigidly attached to the bottom ends of the seat and down tubes 12, 14 via welds W though alternative attachment methods such as bolting or bonding may also be employed in the direct drive bicycle of the present invention. The cartridge housing 16 includes an enlarged upper section 18 and a tapered lower section 20 which is integral with the upper section 18 and extends downwardly and rearwardly therefrom. The bottom end of the seat tube 12 and the bottom end of the down tube 14 are each attached to the upper section 18 of the cartridge housing 16. As best seen in FIG. 4, the lower section 20 itself comprises a juxtaposed pair of identically configured ear portions 22 which extend in spaced relation to each other and define a gap therebetween.

Extending laterally through the ear portions 22 of the lower section 20 of the cartridge housing 16 in close proximity to the rounded distal ends thereof is a coaxially aligned pair of crank axle bores which are sized and configured to rotatably accommodate a crank axle 24. Attached to respective ones of the opposed ends of the crank axle 24 is a pair of elongate pedal cranks 26, each of which includes a pedal rotatably connected to the distal end thereof. Attached to the crank axle 24 between one of the ear portions 22 of the lower section 20 of the cartridge housing 16 and one of the pedal cranks 26 is a chain wheel 28. The rotation of the crank axle 24 via the pedal cranks 26 and pedals facilitates the concurrent rotation of the chain wheel 28 attached to the crank axle 24.

Extending laterally through the upper section 18 of the cartridge housing 16 is a transmission bore. Rotatably mounted within the transmission bore is a variable rate transmission unit 30. The transmission unit 30 comprises a main transmission housing having an annular input hub integrally connected to and extending outwardly from one thereof. Extending outwardly from the opposite end of the transmission housing is an annular output hub which is coaxially aligned with the input hub. The rotatable mounting of the transmission unit 30 within the transmission bore in the upper section 18 of the cartridge housing 16 is facilitated by at least one bearing member which extends between the inner surface of the transmission bore and the outer surface of the transmission housing. The transmission unit 30 further includes a central axle 32 which protrudes from the opposed ends of the transmission housing. The ends of the axle 32 are fixably secured to the main frame and other portions of the direct drive bicycle in a manner which will be described in more detail below.

Due to the integral connection of the input hub of the transmission unit 30 to the transmission housing thereof, the rotation of the input hub facilitates the concurrent rotation of the transmission housing relative to the cartridge housing 16 via the bearing member. The transmission unit 30 is configured such that the rotation of the transmission housing relative to the cartridge housing 16 by the rotation of the input hub facilitates the rotation of the output hub of the transmission unit 30 at a rate different from that of the input hub. In this respect, the rotation of the input hub, and hence the transmission housing, at a first rate of RPM's will result in the simultaneous rotation of the output hub at a differing, second rate of RPM's. The differing rotational speeds of the input and output hubs relative to each other is selectively adjusted by shifting the internal gearing of the transmission unit 30 which is disposed within the transmission housing. Such shifting is accomplished through the use of shift levers which are attached to the handle bars or main frame of the bicycle and are mechanically coupled to the transmission unit 30 via one or more control cables 42. An exemplary transmission unit 30 which may be incorporated into the direct drive bicycle of the present invention is provided under the trademark NEXUS by the Japanese company Shimano.

As best seen in FIGS. 1 and 2, the transmission unit 30 is rotatably mounted within the upper section 18 of the cartridge housing 16 such that the input hub thereof extends from the side of the cartridge housing 16 which is directly adjacent the chain wheel 28. Attached to the input hub of the transmission unit 30 is an input sprocket 34 which is mechanically coupled to the chain wheel 28 via an input chain 36 extending therebetween. As will be recognized, due to the extension of the input chain 36 between the chain wheel 28 and the input sprocket 34, the rotation of the crank axle 24 via the pedal cranks 26 and pedals facilitates the concurrent rotation of the input hub of the transmission unit 30, and hence the transmission housing relative to the cartridge housing 16.

As previously indicated, the opposed ends of the central axle 32 of the transmission unit 30 are fixedly secured to the main frame and to other portions of the bicycle. As further seen in FIGS. 1 and 2, rigidly attached to the end of the central axle 32 protruding from the input hub of the transmission unit 30 is one end of a generally diamond-shaped mounting bracket 38. The central portion of the mounting bracket 38 is rigidly attached to the upper section 18 of the cartridge housing 16 via a pair of fasteners such as screws. Rotatably connected to the end of the mounting bracket 38 opposite that rigidly attached to the central axle 32 is an idler pulley 40 which is cooperatively engaged to the input chain 36. The idler pulley 40 is used to maintain a desired level of tension on the input chain 36. Additionally, mechanically coupled to the transmission unit 30 between the input sprocket 34 and the mounting bracket 38 is one end of a control cable 42. As previously explained, the opposite end of the control cable 42 is connected to one or more shifters which are disposed on the main frame or handle bars of the bicycle, with the control cable 42 being used to selectively adjust or shift the internal gearing of the transmission unit 30.

Figure 6:
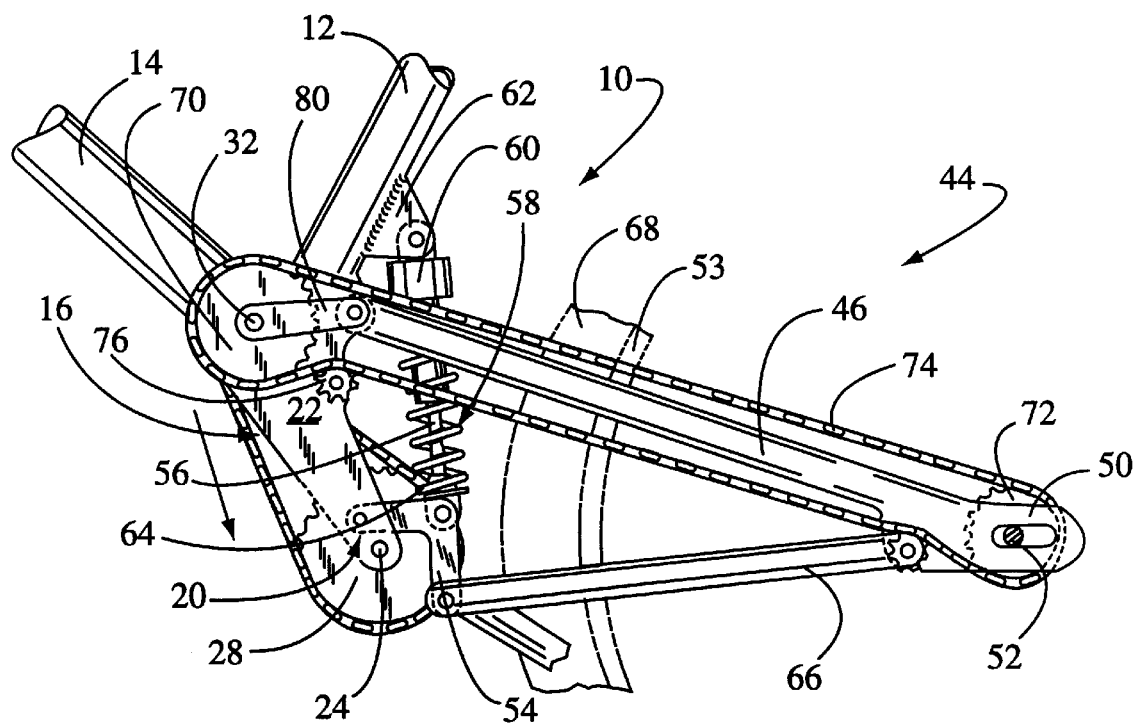
FIG. 6 is a left side elevational view of the drive train of the direct drive bicycle constructed in accordance with the present invention, illustrating the shock absorbing rear assembly thereof in an actuated position.

Referring now to FIGS. 1 and 6, the direct drive bicycle of the present invention further includes a shock absorbing rear assembly 44 which is pivotally connected to the main frame, and in particular to the cartridge housing 16 thereof. The rear assembly 44 itself comprises a pair of seat stays or swingarms 46, the upper ends of which are pivotally connected to the upper section 18 of the cartridge housing 16. In this respect, the swingarms 46 are pivotally connected to the upper section 18 at a swingarm pivot 48 which is disposed adjacent to the transmission unit 30 and in close proximity to the top of the input sprocket 34. Disposed on the lower ends of respective ones of the swingarms 46 is a pair of drop-outs 50. The drop-outs 50 may be integrally connected to the lower ends of the swingarms 46, or may alternatively comprise separate elements which are attached thereto via welding, brazing, or an alternative fastening process. Rotatably connected to the drop-outs 50 is the axle 52 of the rear wheel 53 of the direct drive bicycle.

The rear assembly 44 further includes a generally V-shaped rocker arm or bell crank 54, one end of which is pivotally connected to the lower section 20 of the cartridge housing 16. More particularly, one end of the bell crank 54 is inserted into the gap defined between the ear portions 22 of the lower section 20 and pivotally connected to the ear portions 22. Pivotally connected to the central portion of the bell crank 54 intermediate the opposed ends thereof is the distal end of the piston rod 56 of a shock absorber 58 of the rear assembly 44. As best seen in FIG. 4, a mounting bracket rigidly secured to the distal end of the piston rod 56 is inserted into a slot disposed within the central portion of the bell crank 54, with the mounting bracket, and hence the piston rod 56 of the shock absorber 58, being pivotally connected to the bell crank 54. The piston rod 56 of the shock absorber 58 extends axially from the generally cylindrical body 60 thereof which is itself pivotally connected to the back of the seat tube 12 via a shock plate 62. As further seen in FIG. 4, the shock plate 62 defines an opposed pair of ear portions, with a mounting flange formed on the body 60 of the shock absorber 58 being inserted between the ear portions of the shock plate 62 and pivotally connected thereto. In addition to the piston rod 56 and body 60, the shock absorber 58 includes a coil spring 64 which extends between a first annular shoulder defined by the body 60 and a second annular shoulder defined by the mounting bracket attached to the distal end of the piston rod 56.

In addition to the swingarms 46, drop-outs 50, rear wheel 53, bell crank 54 and shock absorber 58, the rear assembly 44 of the direct drive bicycle includes a pair of chain stays 66. The front ends of the chain stays 66 are pivotally connected to the end of the bell crank 54 opposite the end pivotally connected to the ear portions 22 of the lower section 20 of the cartridge housing 16. The back ends of the chain stays 66 are pivotally connected to respective ones of the drop-outs 50. As best seen in FIG. 4, the distance separating the chain stay 66 from each other, as well as the distance separating the swingarms 46 from each other, is adapted to provide sufficient clearance for the tire 68 (shown in phantom) of the rear wheel 53.

When the rear assembly 44 is pivotally connected to the main frame in the above-described manner, the swingarms 46, drop-outs 50, chain stays 66 and cartridge housing 16 generally define a rear triangle of the bicycle. Due to the configuration of the rear assembly 44 and the manner in which it is interfaced to the main frame of the bicycle as described above, the rear assembly 44 is a shock absorbing active rear suspension of the direct drive bicycle of the present invention which is actuated when the rear wheel 53 encounters a bump or other obstruction.

Figure 5:
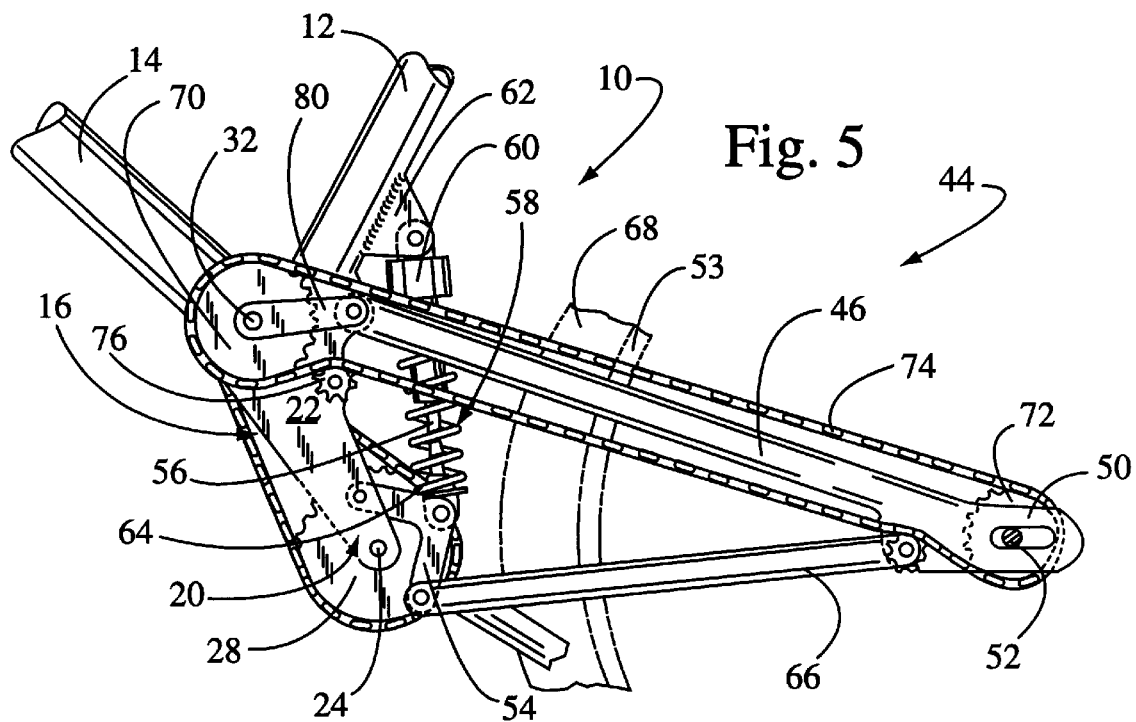
FIG. 5 is a left side elevational view of the drive train of the direct drive bicycle constructed in accordance with the present invention, illustrating the shock absorbing rear assembly thereof in an unactuated position.

The rear assembly 44 of the direct drive bicycle normally assumes the unactuated position shown in FIG. 5. When a force is applied to the tire 68 of the rear wheel 53 as occurs when the same encounters a bump or other obstruction, the rear assembly 44 is caused to be pivoted upwardly in the manner shown in FIG. 6. More particularly, the swingarms 46 and chain stays 66 are pivoted upwardly which results in the movement of the axle 52 of the rear wheel 53 in an upward arc, and the movement of the bell crank 54 in a counter-clockwise direction. Such counter-clockwise movement of the bell crank 54 facilitates the compression of the shock absorber 58 thus effectively dampening the impact force applied to the rear wheel 53. After the bump or other obstruction has been cleared, the rebound of the shock absorber 58 facilitates the movement of the bell crank 54 in a clockwise direction back to its original position. Such movement of the bell crank 54 facilitates the downward pivotal movement of the swingarms 46 and chain stays 66, as well as the movement of the axle 52 of the rear wheel 53 in a downward arc, thus returning the rear assembly 44 to its original, unactuated position as shown in FIG. 5.

In the preferred embodiment, the front triangle or main frame of the bicycle, including the seat and down tubes 12, 14 and cartridge housing 16, is preferably fabricated from an aluminum material or a composite material. The swingarms 46, drop-outs 50, bell crank 54 and chain stays 66 are themselves each preferably fabricated from an aluminum material. However, those of ordinary skill in the art will recognize that alternative materials may be used for these components of the direct drive bicycle. Additionally, though the direct drive bicycle is preferably provided with the shock absorbing rear assembly 44, it will be recognized that it may alternatively be provided with a "hard tail" wherein the bell crank 54 is eliminated, and the front ends of the chain stays 66 as well as the upper ends of the swingarms 46 are rigidly attached to the cartridge housing 16.

Referring now to FIGS. 1–4, attached to the output hub of the transmission unit 30 is an output sprocket 70. Additionally, attached to the rear wheel 53, and in particular to the axle 52 thereof, is a rear wheel sprocket 72. Extending between the output sprocket 70 and the rear wheel sprocket 72 is an output chain 74 which mechanically couples the output hub of the transmission unit 30 to the axle 52, and hence the rear wheel 53. As such, due to the extension of the output chain 74 between the output sprocket 70 and the rear wheel sprocket 72, the rotation of the output hub facilitates the concurrent rotation of the rear wheel 53 of the direct drive bicycle.

Figure 3:
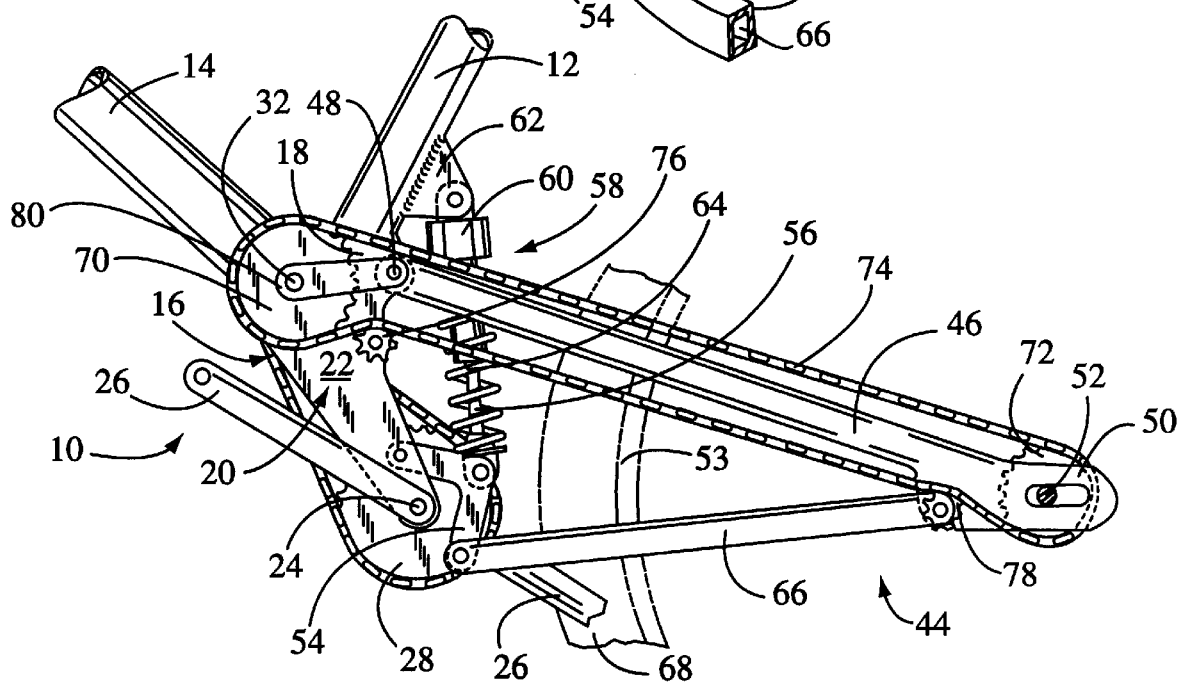
FIG. 3 is a left side elevational view of the drive train of the direct drive bicycle constructed in accordance with the present invention.

As best seen in FIGS. 1, 3 and 4, the output chain 74 extends along one of the swingarms 46 of the rear assembly 44 above and below the swingarm pivot 48. In the preferred embodiment, the spacing of the output chain 74 above the swingarm pivot 48 is substantially equal to the spacing of the output chain 74 below the swingarm pivot 48. Such spacing reduces growth of the output chain 74 when the rear assembly 44 is pivoted upwardly to its actuated position (shown in FIG. 6), thus eliminating the need for a chain tensioner for use in conjunction with the output chain 74. To achieve this desired spacing of the output chain 74 relative to the swingarm pivot 48, rotatably connected to the upper section 18 of the cartridge housing 16 is a first output chain sprocket 76 which is cooperatively engaged to the output chain 74. Additionally, rotatably connected to the rear assembly 44 at the pivotal connection of the back end of the one of the chain stays 66 to a respective one of the drop-outs 50, is a second output chain sprocket 78 which is identically configured to the first output chain sprocket 76 and is itself cooperatively engaged to the output chain 74. The first and second output chain sprockets 76, 78 direct the follower side of the output chain 74 (as opposed to the drive side) toward one of the swingarms 46.

As previously explained, the end of the axle 32 of the transmission unit 30 protruding from the input hub is fixedly secured to the upper section 18 of the cartridge housing 16 via the mounting bracket 38. As seen in FIGS. 3–6, the opposite end of the axle 32 protruding from the output hub of the transmission unit 30 is itself fixedly secured to the cartridge housing 16 via a mounting link 80. In particular, one end of the mounting link 80 is rigidly attached to the axle 32 of the transmission unit 30, with the opposite end of the mounting link 80 being attached to a boss extending from the corresponding side of the upper section 18 of the cartridge housing 16. The combination of the mounting bracket 38 and mounting link 80 effectively prevents any rotation of the axle 32 relative to the cartridge housing 16.

In the direct drive bicycle of the present invention, the transmission unit 30 is incorporated into the cartridge housing 16 rather than directly within the rear wheel 53 for purposes of reducing the unsprung weight on the rear assembly 44. The pivoting rear assembly 44 provides the rear suspension of the direct drive bicycle with anti-squat performance characteristics. Additionally, in the direct drive bicycle of the present invention, the inclusion of the transmission unit 30 within the cartridge housing 16 provides the bicycle with multiple speed capability, while eliminating multiple chain wheels, a sprocket cluster on the rear wheel axle 52, and front and rear derailleurs. The inclusion of only the rear wheel sprocket 72 on the axle 52 rather than a sprocket cluster allows the rear wheel 53 to have a wide or "stance" without causing the same to be excessively oversized. This wider stance enhances the handling and performance of the bicycle. Due to the absence of the front and rear derailleurs, the direct drive bicycle of the present invention is also significantly less susceptible to mechanical breakdown.

Additional modifications and improvements of the present invention may also be apparent to those of ordinary skill in the art. Thus, the particular combination of parts described and illustrated herein is intended to represent only one embodiment of the present invention, and is not intended to serve as limitations of alternative devices within the spirit and scope of the invention.

What is claimed is:

1. A direct drive bicycle comprising:
   a main frame;
   a rear assembly attached to the main frame and comprising:
      a pair of swing arms pivotally connected to the main frame;
      a pair of drop-outs disposed on respective ones of the swingarms;
      a rear wheel rotatable connected to the drop-outs;
      a bell crank pivotally connected to the main frame;
      a shock absorber pivotally connected to and extending between the bell crank and the main frame; and
      a pair of chain stays pivotally connected to and extending between the bell crank and respective ones of the drop-outs;
   a variable rate transmission unit mounted within the main frame and having rotatable input and output hubs, the output hub being mechanically coupled to the rear wheel in a manner wherein the rotation of the output hub facilitates the rotation of the rear wheel; and
   a chain wheel rotatably connected to the main frame, said chain wheel being mechanically coupled to the input hub in a manner wherein the rotation of the chain wheel facilitates the rotation of the input hub.

2. The bicycle of claim 1 further comprising:
   an input sprocket attached to said input hub; and
   an input chain extending between the chain wheel and the input sprocket for mechanically coupling the chain wheel to the input hub.

3. The bicycle of claim 2 further comprising an idler pulley rotatably connected to the main frame and cooperatively engaged to the input chain to maintain a desired level of tension thereon.

4. The bicycle of claim 2 further comprising:
   a crank axle rotatably connected to the main frame;
   a pair of pedal cranks attached to the crank axle; and
   a pair of pedals rotatably connected to respective ones of the pedal cranks;
   said chain wheel being attached to said crank axle.

5. The bicycle of claim 1 wherein the transmission unit is rotatably mounted within the main frame via at least one bearing member.

6. The bicycle of claim 1 further comprising:
   an output sprocket attached to the output hub;

a rear wheel sprocket attached to the rear wheel; and an output chain extending between the output sprocket and the rear wheel sprocket for mechanically coupling the output hub to the rear wheel.

7. The bicycle of claim 1 wherein:

the swingarms are pivotally connected to the main frame at a swingarm pivot;

the output chain extends along one of the swingarms above and below the swingarm pivot; and the spacing of the output chain above the swingarm pivot is substantially equal to the spacing of the output chain below the swingarm pivot.

8. The bicycle of claim 7 further comprising a pair of output chain sprockets rotatably connected to the rear assembly and cooperatively engaged to the output chain for assisting in achieving the desired spacing of the output chain above and below the swingarm pivot.

9. The bicycle of claim 7 wherein the swingarm pivot is disposed adjacent the transmission unit mounted within the main frame.

10. The bicycle of claim 1 wherein the main frame comprises:

a seat tube;

a down tube; and a cartridge housing attached to said seat and down tubes;

said shock absorber being pivotally connected to said seat tube, said swingarms and said bell crank being pivotally connected to said cartridge housing, and said transmission unit being mounted within said cartridge housing.

11. A direct drive bicycle comprising:

a main frame;

a variable rate transmission unit mounted within the main frame and having rotatable input and output hubs;

a chain wheel rotatably connected to the main frame and mechanically coupled to the input hub in a manner wherein the rotation of the chain wheel facilitates the rotation of the input hub;

a rear assembly attached to the main frame and including a pair of swingarms pivotally connected to the main frame at a swingarm pivot;

a rear wheel rotatably connected to the rear assembly; and an output chain extending between the output hub and the rear wheel along one of the swingarms above and below the swingarm pivot for mechanically coupling the output hub to the rear wheel in a manner wherein the rotation of the output hub facilitates the rotation of the rear wheel;

the spacing of the output chain above the swingarm pivot being substantially equal to the spacing of the output chain below the swingarm pivot.

12. The bicycle of claim 11 further comprising a pair of output chain sprockets rotatably connected to the rear assembly for assisting in achieving the desired spacing of the output chain above and below the swingarm pivot.

13. The bicycle of claim 11 wherein the rear assembly further comprises:

a pair of drop-outs disposed on respective ones of the swingarms, said rear wheel being rotatably connected to the drop-outs;

a bell crank pivotally connected to the main frame;

a shock absorber pivotally connected to and extending between the bell crank and the main frame; and a pair of chain stays pivotally connected to and extending between the bell crank and respective ones of the drop-outs.

14. The bicycle of claim 13 wherein the main frame comprises:

a seat tube;

a down tube; and a cartridge housing attached to said seat and down tubes;

said shock absorber being pivotally connected to said seat tube, said swingarms and said bell crank being pivotally connected to said cartridge housing, and said transmission unit being mounted within said cartridge housing.

15. The bicycle of claim 14 further comprising:

an input sprocket attached to said input hub; and an input chain extending between the chain wheel and the input sprocket for mechanically coupling the chain wheel to the input hub.

16. The bicycle of claim 15 further comprising an idler pulley rotatably connected to the cartridge housing and cooperatively engaged to the input chain to maintain a desired level of tension thereon.

17. The bicycle of claim 15 further comprising:

a crank axle rotatably connected to the cartridge housing;

a pair of pedal cranks attached to the crank axle; and a pair of pedals rotatably connected to respective ones of the pedal cranks;

said chain wheel being attached to said crank axle.

18. The bicycle of claim 14 further comprising:

an output sprocket attached to the output hub; and a rear wheel sprocket attached to the rear wheel;

said output chain extending between the output sprocket and the rear wheel sprocket for mechanically coupling the output hub to the rear wheel.

19. The bicycle of claim 14 wherein the swingarm pivot is disposed within the cartridge housing adjacent the transmission unit mounted therein.

20. A direct drive bicycle, comprising:

a main frame;

a variable rate transmission unit mounted within the main frame;

a rear assembly attached to the main frame and including at least one swingarm pivotally connected to the main frame at a swingarm pivot;

a rear wheel rotatably connected to the rear assembly; and an output chain mechanically coupling the transmission unit to the rear wheel and extending along the swingarm above and below the swingarm pivot.

21. The bicycle of claim 20 wherein the spacing of the output chain above the swingarm pivot is substantially equal to the spacing of the output chain below the swingarm pivot.

22. The bicycle of claim 21 wherein the swingarm pivot is disposed adjacent the transmission unit mounted within the main frame.

23. The bicycle of claim 21 further comprising a pair of output chain sprockets rotatably connected to the rear assembly for assisting in achieving the desired spacing of the output chain above and below the swingarm pivot.

* * * * *